March 21, 1967 J. G. DRESSER 3,309,729
COATING REMOVER
Filed July 17, 1964
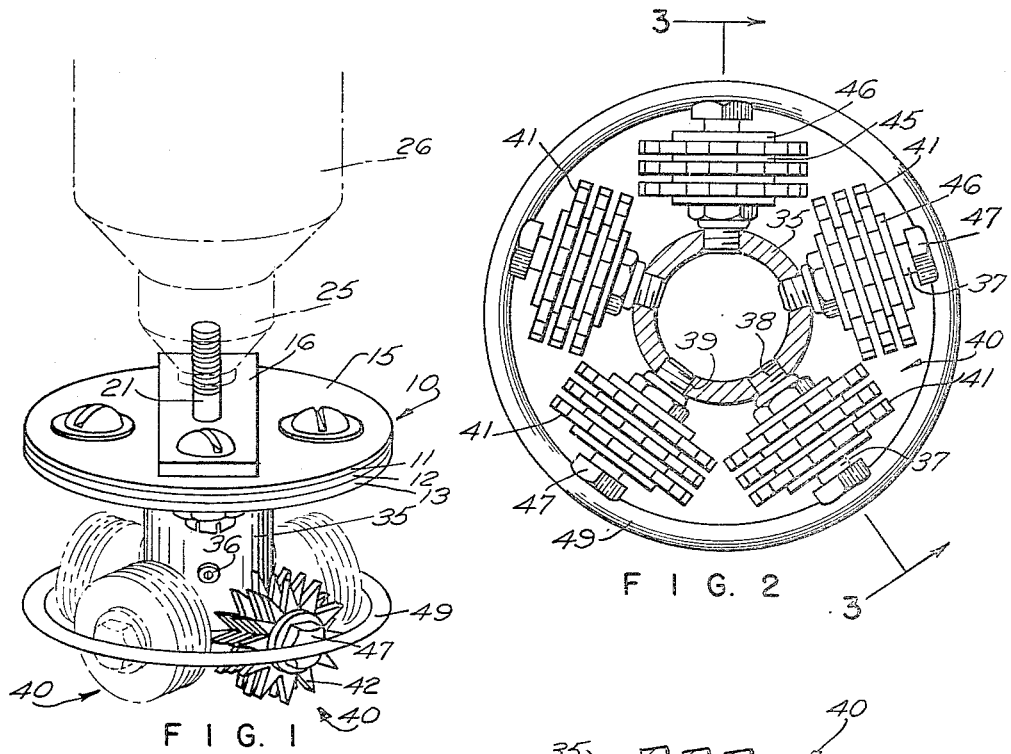
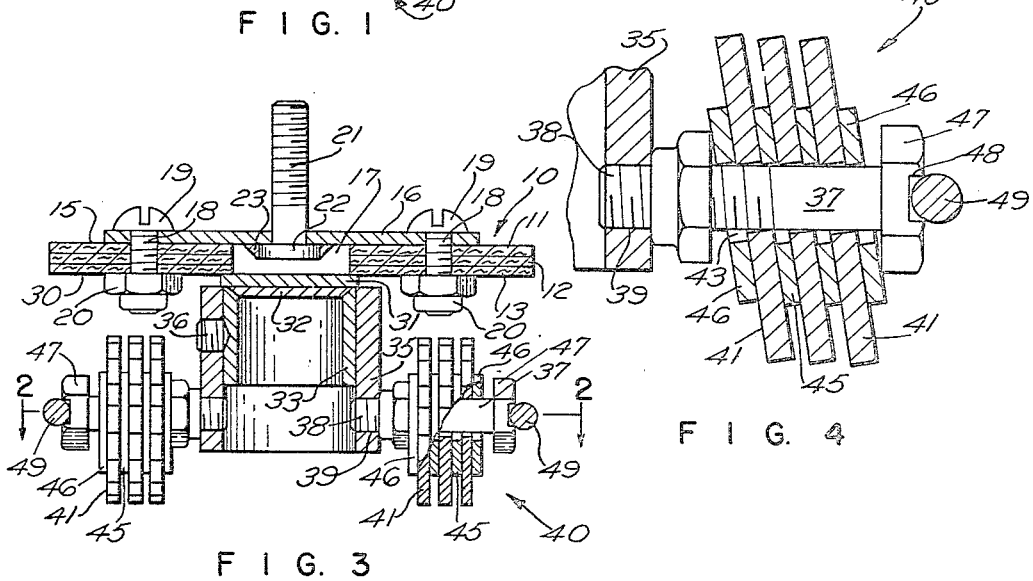
INVENTOR.
JASPER GILBERT DRESSER
BY
Barlow & Barlow
ATTORNEYS

United States Patent Office 3,309,729
Patented Mar. 21, 1967

3,309,729
COATING REMOVER
Jasper Gilbert Dresser, Boynton Beach, Fla., assignor to Dresser Engineering, Inc., a corporation of Rhode Island
Filed July 17, 1964, Ser. No. 383,377
4 Claims. (Cl. 15—236)

This invention relates to a device for removing a coating from a surface, particularly for removing paint or rust from steel or masonry.

An object of this invention is to provide a mechanical device which may be placed in the chuck of an electric drill or the like to be operated by the motor of the electric drill for the removal of paint or rust as above indicated.

Another object of this invention is to provide a simple means of providing a flexible drive to the burnishing members, which are driven.

Another object of the invention is to provide a means for preventing flying material which may be removed from the surface operated upon from flying directly upwardly into the face of the operator.

Another object of the invention is to provide a guard against the breaking or loosening of the means for holding the burnishing wheels in place, which might easily occur due to the severe vibration of the assembly when in operation.

With these and other objects in view, the invention consists of certain novel features of construction as will be more fully described and particularly pointed out in the appended claims.

In the accompanying drawings:

FIG. 1 is a perspective view showing the device as mounted in the chuck of an electric drill;

FIG. 2 is a section on substantially line 2—2 of FIG. 3;

FIG. 3 is a section on substantially line 3—3 of FIG. 2; and

FIG. 4 is a sectional view on a somewhat larger scale through the axis of the mounting of the dressing members but showing the dressing members in a different position than shown in FIG. 3.

In proceeding with this invention, I have mounted a disc of generally circular shape and which is flexible by reason of its being made up of laminated layers of fabric and resin bonding the fabric together, something in the nature of a material used for belting, and I have utilized a narrow bar extending across the center of the disc on one side to be received in a chuck of a drill motor, while on the other side I have mounted a bar at substantially right angles to the first bar and extending across the center of the disc which carries the dressing means; and I have arranged for the dressing means to be removably mounted so that it may be interchanged as occasion may require.

With reference to the drawings, 10 designates a flexible disc which is formed of layers of fabric 11, 12, 13 bonded by some resin or adhesive into a laminated sheet and which in the present instance is about ¼ of an inch in thickness. It has substantial flexibility out of its general plane when unsupported. The upper side 15 of this disc has a bar 16 extending across the open center 17 of the disc and of a relatively narrow width so that the major portion of the disc on either side of the bar is unsupported thereby. The bar is bolted to the upper surface of the disc by bolts 18 having heads 19 engaging the bar, while nuts 20 draw the bar snugly against the upper surface of the disc. A shaft 21 extends upwardly from the bar 16 and has a head 22 extending through the bar and welded to the bar as at 23, thus causing this shaft to be rigid with the bar. This shaft 21 is the means by which the device is mounted in the chuck 25 of an electric drill motor 26 so that when the motor is actuated, the shaft 21 will be rotated. This shaft 21 may be threaded in case it is to be mounted in some other means for rotating it, although in the chuck shown threading is not required.

On the under surface 30 of the disc there is a second bar 31 which extends across the open center 17 of the disc in a direction at right angles to the extent of the first bar 16, and this bar is similarly secured to the disc by bolts as was the bar 16, these bars, being narrow and mounted at right angles to each other, permit of a substantially universal movement, although somewhat restricted, of the disc about its axis. Fixed to the under surface of the bar 31 such as by welding 32, there is a cylindrical member 33 having its center on the axis of rotation or coaxial with the shaft 21, and it is upon this cylindrical member that the burnishing or surface dressing means of the device is mounted.

The surface dressing means comprises a collar or hub 35 which will slide upon the cylindrical member 33 and may be fastened thereto by a set screw 36 having an Allen head. The axial extent of this collar 35 is greater than the cylindrical member 33, and radiating from this collar 35, there are a plurality of shafts, here shown as four, and designated 37 which have threaded ends 38 screwed into threaded bores 39 in the collar 35 so as to mount them in a plane at right angles to the axis of rotation of the device and radiating from such axis. A plurality of dressing members 40 are mounted on each of these axles 37 and, as here shown, comprise rotatable star wheels 41 having a plurality of teeth 42 extending radially from the hub of the wheel. The opening through each of these wheels 43 is much larger than the axle 37 on which they are mounted, and these wheels 41 are spaced from each other by washers 45 and spaced from the end securing means by similar washers 46. The axles are usually formed by bolts which are threaded into the sockets 39 and are provided with heads 47, which are recessed as at 48. In these recesses 48 there is located a ring 49 which serves the double function of preventing the bolts or axles from becoming detached from the collar 35 due to the severe chattering or vibrating action of the device when in use and also serves as a guard to prevent the device from abrading some object with which it might come in contact when in operation. By reason of the loose mounting of the star wheels 41, they may assume various angles either in a plane at right angles to the axle 37 or at an angle thereto as shown in FIG. 4.

From the above it will be apparent that the entire device may be mounted in the chuck of a hand drill driven by an electric motor and utilized in a manner for scouring the surface of such parts as it is desired to clean from a coating of iron rust, paint, or the like. Should the dressing means become worn, the collar 35 may be removed, and a new dressing means positioned in its place, or should some of the star wheels become injured and it is desired to replace only a few of the star wheels, then the guard ring 49 may be sprung from its holding position, the axles unthreaded and a new star wheel inserted. The extreme flexibility of the disc assists materially in the use of the device in operation upon the surface of the work as intended and also prevents chips from flying upwardly into the face of the user.

I claim:

1. A device for removing a coating from a surface comprising a central hub, a plurality of shafts threaded into said central hub to rigidly mount them at one end thereof only with reference to said hub, said shafts extending radially outwardly from said hub, each shaft having a slot in its outer end surface, a removable guard ring encircling said shafts and frictionally lodged in said slot to prevent the shafts from turning to unthread from said hub and to act as a guard about said device, dressing means on said shafts and means for flexibly mounting said hub in a rotatable means.

2. A device as in claim 1 wherein said shafts are in substantially a single plane and said slots extend in said plane.

3. A device as in claim 1 wherein said dressing means are rotatably mounted on said shafts.

4. A device as in claim 1 wherein said dressing means are rotatably and loosely mounted on said shafts.

References Cited by the Examiner
UNITED STATES PATENTS

| | | | |
|---|---|---|---|
| 1,334,439 | 3/1920 | Davis | 64—13 X |
| 1,581,699 | 4/1926 | Sturrock | 29—81 X |

CHARLES A. WILLMUTH, *Primary Examiner.*

L. G. MACHLIN, *Assistant Examiner.*